(12) United States Patent
Farwell

(10) Patent No.: US 6,948,080 B2
(45) Date of Patent: Sep. 20, 2005

(54) SYSTEM AND METHOD FOR MINIMIZING UPSETS IN DIGITAL MICROCIRCUITS VIA AMBIENT RADIATION MONITORING

(75) Inventor: William D. Farwell, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 645 days.

(21) Appl. No.: 10/043,368

(22) Filed: Jan. 9, 2002

(65) Prior Publication Data

US 2004/0078660 A1 Apr. 22, 2004

(51) Int. Cl.$^7$ ................................................ G06F 1/26
(52) U.S. Cl. ...................................... 713/300; 713/310
(58) Field of Search ................................ 713/300, 310

(56) References Cited

U.S. PATENT DOCUMENTS

| | | | | |
|---|---|---|---|---|
| 3,703,645 A | * | 11/1972 | Swift ......................... | 307/154 |
| 4,032,838 A | * | 6/1977 | Minami et al. ............. | 323/349 |
| 4,156,940 A | * | 5/1979 | Hollingsworth et al. ..................... | 365/189.09 |
| 5,485,486 A | * | 1/1996 | Gilhousen et al. .......... | 370/335 |
| 5,689,175 A | * | 11/1997 | Hanson et al. ............... | 322/28 |
| 6,301,128 B1 | * | 10/2001 | Jang et al. .................... | 363/17 |
| 6,483,739 B2 | * | 11/2002 | Houston ...................... | 365/154 |
| 6,522,078 B1 | * | 2/2003 | Okamoto et al. ........... | 315/149 |
| 6,768,144 B2 | * | 7/2004 | Houston et al. ............ | 257/207 |
| 2002/0003653 A1 | * | 1/2002 | Takeda et al. .............. | 359/333 |
| 2002/0045460 A1 | * | 4/2002 | Makinen et al. ............ | 455/522 |

OTHER PUBLICATIONS

Ikeda et al, A Soft Error Immune 0.35 Micron PD–SOI SRAM Technology Compatible With Bulk CMOS, Proc. 1998 IEEE Int'l SOI Conf., Oct. 1998.

ASIC Products Application Note, "Quality and Reliability," Rev. 3, SA14–2280–03, IBM, 1999.

IBM ASIC SA–27 Databook, 1998, available on website: www.IBM.com/chips/products/asic.

* cited by examiner

*Primary Examiner*—Lynne H. Browne
*Assistant Examiner*—Tse Chen
(74) *Attorney, Agent, or Firm*—Leonard A. Alkov; Karl A. Vick

(57) ABSTRACT

A system and method for maintaining the upset rate of microcircuits within acceptable limits, while optimizing performance and, optionally, not increasing power consumption. The system comprises a variable power supply, which supplies power to the microcircuit; a controller which provides an instructions to the variable power supply to vary voltage depending on susceptibility to upsets; and an actuator for sending an actuating signal to the controller. The system can include a variable frequency clock for varying the clock rate of the microcircuit and the controller can send instructions to vary the clock rate in order to keep power consumption constant.

18 Claims, 6 Drawing Sheets

US 6,948,080 B2

SYSTEM AND METHOD FOR MINIMIZING UPSETS IN DIGITAL MICROCIRCUITS VIA AMBIENT RADIATION MONITORING

BACKGROUND OF THE INVENTION

1. Field of Invention

The present invention relates to microcircuits. Specifically, the present invention relates to systems and methods for minimizing the susceptibility of microcircuits to upsets.

2. Description of the Related Art

It has been found that certain environmental conditions can increase the propensity of microcircuits to upsets of operation. The term "upset" refers to an erroneous change in the state of one or more storage elements in a digital system. A storage element is a circuit device that holds digital information for future processing. Storage element errors will propagate through subsequent logic and storage elements causing a failure of operation. Upsets are caused by erroneous insertion of positive and negative charges into the digital circuitry by several mechanisms, the most important being electromagnetic and nuclear radiation.

For particular applications, such as operating on-board spacecraft, digital systems are especially prone to upset, due exposure to high levels of radiation. Components used in these environments are typically specified with an upset rating in upsets/storage bit/day. Parts with low upset specifications tend to be more costly and to offer lower performance than conventional digital devices. To date the principal methods of counteracting upsets are to: provide low-upset components, provide redundancy, or (if radiation is the cause of the upsets) harden or shield the affected components. Generally, these options increase the cost, weight and power consumption of the system. This is a general problem in an industry that is constantly striving to provide smaller, more powerful microprocessors with lower power consumption, and is especially critical in spacecraft and aircraft applications.

Hence, a need remains in the art for a system and method for maintaining the upset rate of microcircuits within acceptable limits, while optimizing performance and minimizing power consumption.

SUMMARY OF THE INVENTION

The need in the art is addressed by teachings of the present invention. The present invention provides a system and method for maintaining the upset rate of microcircuits within acceptable limits, while optimizing performance while, optionally, without increasing power consumption. Generally, the system comprises a variable power supply, which supplies power to the circuit or microcircuit; a controller which provides an instruction to the variable power supply to increase voltage when susceptibility to upsets is high and an instruction to decrease voltage when susceptibility to upsets is low; and an actuator for sending an actuating signal to the controller.

The controller can be a remote ground station and the actuator can be a member of the ground crew. Alternatively the actuator can be a pre-programmed clock (which could be the system clock), a radiation monitor (which monitors local, ambient radiation) or an error rate monitor (which monitors the error rate in the microcircuit).

Optionally, the system can include a variable frequency clock for regulating the clock rate of the microcircuit and in which the controller additionally sends an instruction to increase the clock rate when susceptibility to upsets is low and an instruction to decrease the clock rate when susceptibility to upsets is high. In this case power consumption of the microcircuit is kept constant.

The method includes the steps of supplying power to a circuit; providing a first instruction to a variable power supply to increase the voltage supplied to said circuit when susceptibility to upsets is high and a second instruction to decrease the voltage supplied to said circuit when susceptibility to upsets is low; and sending an actuating signal to a controller.

The supply voltage can be varied by remote control, as a function of time, as a function of local radiation, or as a function of perceived error rate in the microcircuit. Optionally, the method as can include the step of varying the clock rate of the microcircuit in order to keep power consumption constant.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention provides a system and method by which the power supply voltage is dynamically varied to optimize two important operational variables, as a function of environmental conditions. The variables are: 1) single-event upset (SEU) rate and 2) operating efficiency (or performance per watt). The supply voltage is set as low as possible, based on acceptable upset rate, in order to achieve the best performance/watt. Voltage is set higher, as environmental conditions tend to increase the propensity for upset. The "acceptable system upset rate" varies considerably, depending on specific application requirements. For critical uses, without redundancy, this may be one upset per several thousand hours. For systems employing redundancy (such as voting or EDAC), this could be as high as several per second. The invention is applicable to any specific requirement across this range.

The invention takes advantage of several key characteristics which vary with supply voltage in digital CMOS circuits: 1) upset rate varies inversely (strongly) with supply voltage, 2) the ratio of power to performance (power/performance ratio) varies directly with supply voltage, and 3) hard failure rate varies directly (strongly) with voltage.

Figure 1:
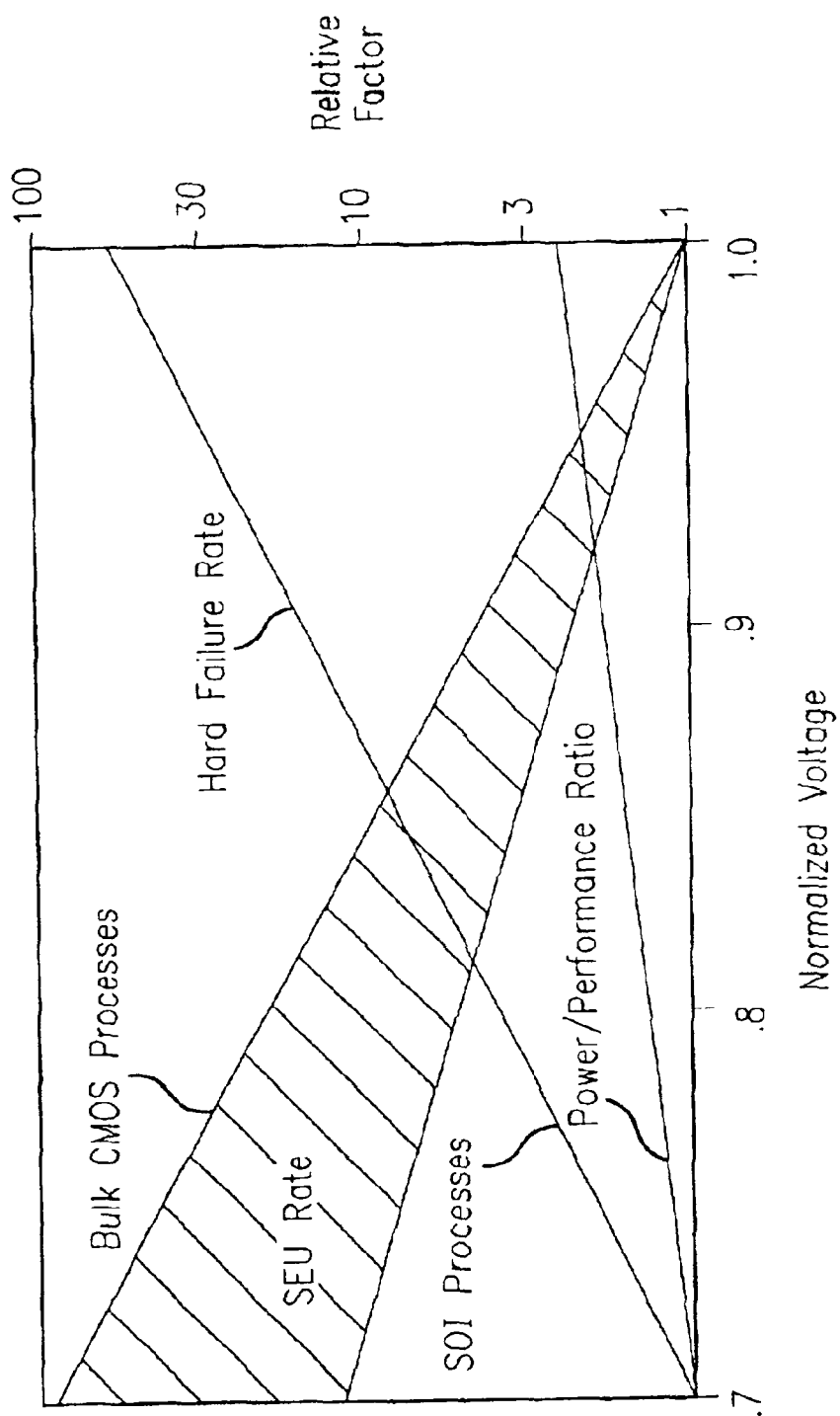
FIG. 1 is a graph illustrating the relative variation of several performance factors versus normalized voltage.

FIG. 1 is a graph illustrating the relative variation of several performance factors versus normalized voltage. These data are gathered from a variety of sources ([1] Ikeda, et al, "Immune, 0.35 Micron SOI SRAM Technology Compatible with Bulk CMOS," Proceedings 1988 IEEE Intl. SOI Conf. October 1998, [2] IBM ASIC Application Note "Quality and Reliability, Rev. 3", IBM, 1999. [3] IBM ASIC SA27 Databook, IBM, 1998.) and are from measurements on 0.35, 0.32, and 0.18 micron CMOS processes. The voltage range (0.66× to 1.0×) represents the region within which a given CMOS process may be operated (e.g., 1.2–1.8V for 0.18 u, 0.8V–1.2V for 0.10 u, etc). Note that SEU rate is worse for lower voltages, while both power and hard failure rate are better. The invention also employs the well-known CMOS characteristic that performance and power dissipation both vary directly with clock rate.

These characteristics are manipulated by dynamically adjusting supply voltage and clock rate. The ability to change the voltage and clock during digital system operation is currently in wide use. For example, some microcircuit systems, e.g. laptop computers, employ reduction of supply voltage and clock rate as computational demand decreases in order minimize power usage. However, these control capabilities have not heretofore been used to moderate upset rate.

In accordance with the teachings of the present invention, the supply voltage is normally set to the lowest value that will provide the acceptable system upset rate (which results in the lowest power/performance ratio as well as lowest hard failure rate). During periods of higher upset potential (e.g., in spacecraft use, high radiation due to solar activity), voltage is increased, and, optionally, clock rate reduced (to maintain constant power drain). Thus, if clock rate is reduced, extra upset tolerance is provided when needed, at the expense of throughput. Alternatively, if the clock rate is kept constant, performance will be unchanged but more power will be used. This may be acceptable if higher power drain could be tolerated for the duration of the increased SEU activity. For example in a spacecraft in an orbit passing through the South Atlantic anomaly, where radiation intensity is greater than in other positions of orbit, since the time of exposure is relatively short, temporary additional power could be provided by a battery.

Figure 2:
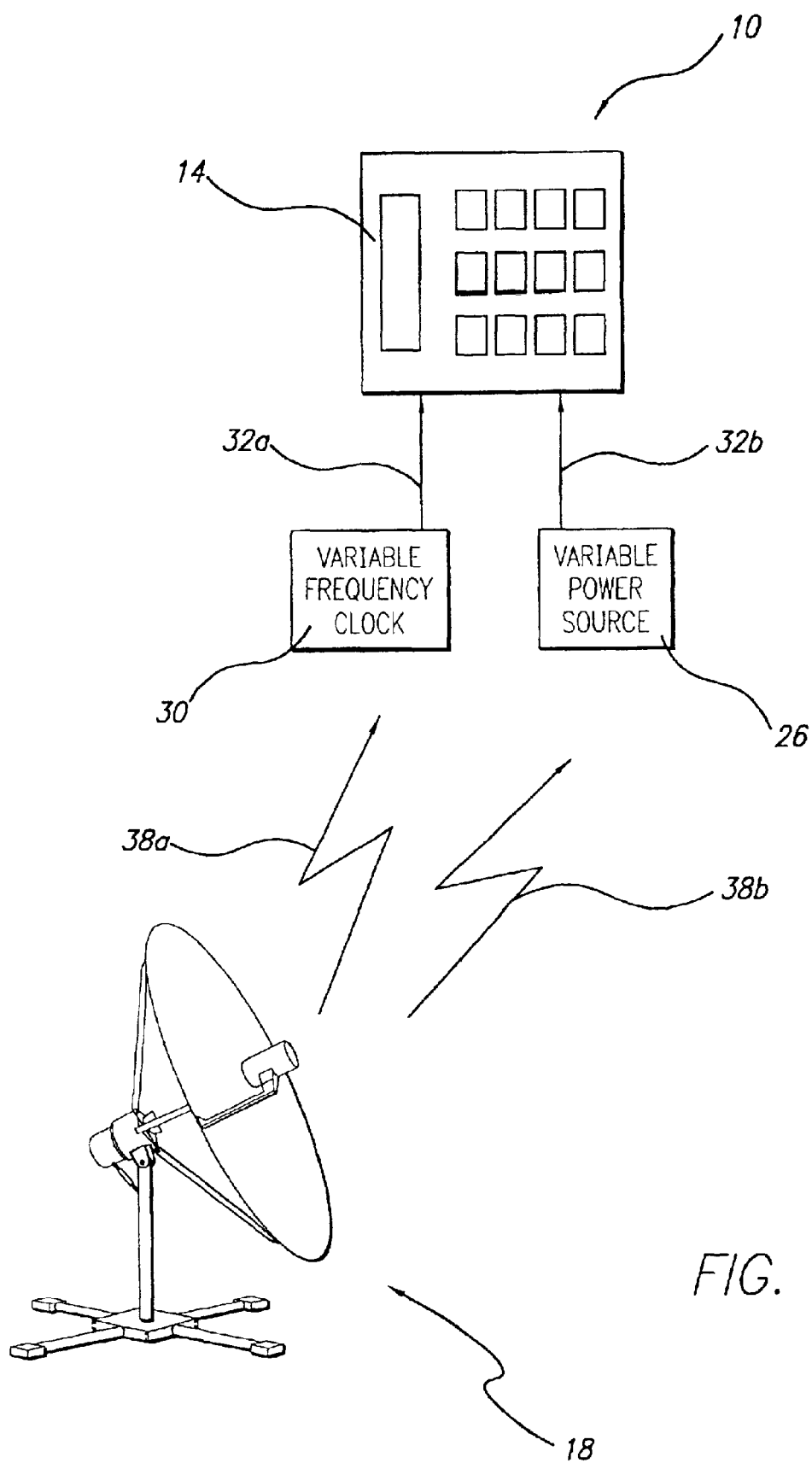
FIG. 2 is a block diagram illustrating an embodiment of the present invention in which the voltage supply is controlled remotely.

In accordance with the present teachings, for methods are disclosed below by which voltage may be varied, in order to compensate for increased upset potential. FIG. 2 below illustrates the first method, which is by external command.

FIG. 2 is a block diagram illustrating an embodiment of the present invention in which the voltage supply is controlled remotely. Assume a spacecraft is commanded from the ground to change supply voltage 32b, based on observation of solar activity. Spacecraft, especially communications satellites, are not autonomous and need constant monitoring and correction from the ground. Correction is accomplished by sending the appropriate signal. FIG. 2 shows a system 10 and a ground station 18. The system contains at least one microcircuit 14, a variable power source 26 and a variable frequency clock 30. The ground station 18 broadcasts a signal containing an instruction 38b to the variable power source 26, which varies the voltage 32b. Optionally, the ground station 18 broadcasts a signal containing an instruction 38a to the variable frequency clock 30, which varies the clock rate 32a. The instructions are sent by the ground crew to achieve the desired upset rate and performance. In illustrative spacecraft application, instructions 38a, 38b for varying supply voltage 32b and clock rate 32a are added to the signals sent. The ground station functions as the controller for the variable frequency clock 30 and the variable power supply 26. The ground crew, when it exercises its decision making abilities, actuates the ground station to send the instructions 38a, 38b. Connection between the ground station and the variable frequency clock 30 and the variable power supply 26 is provided by radio waves. So, in this case, the instructions 38a, 38b are carried on the radio beam.

Figure 3:
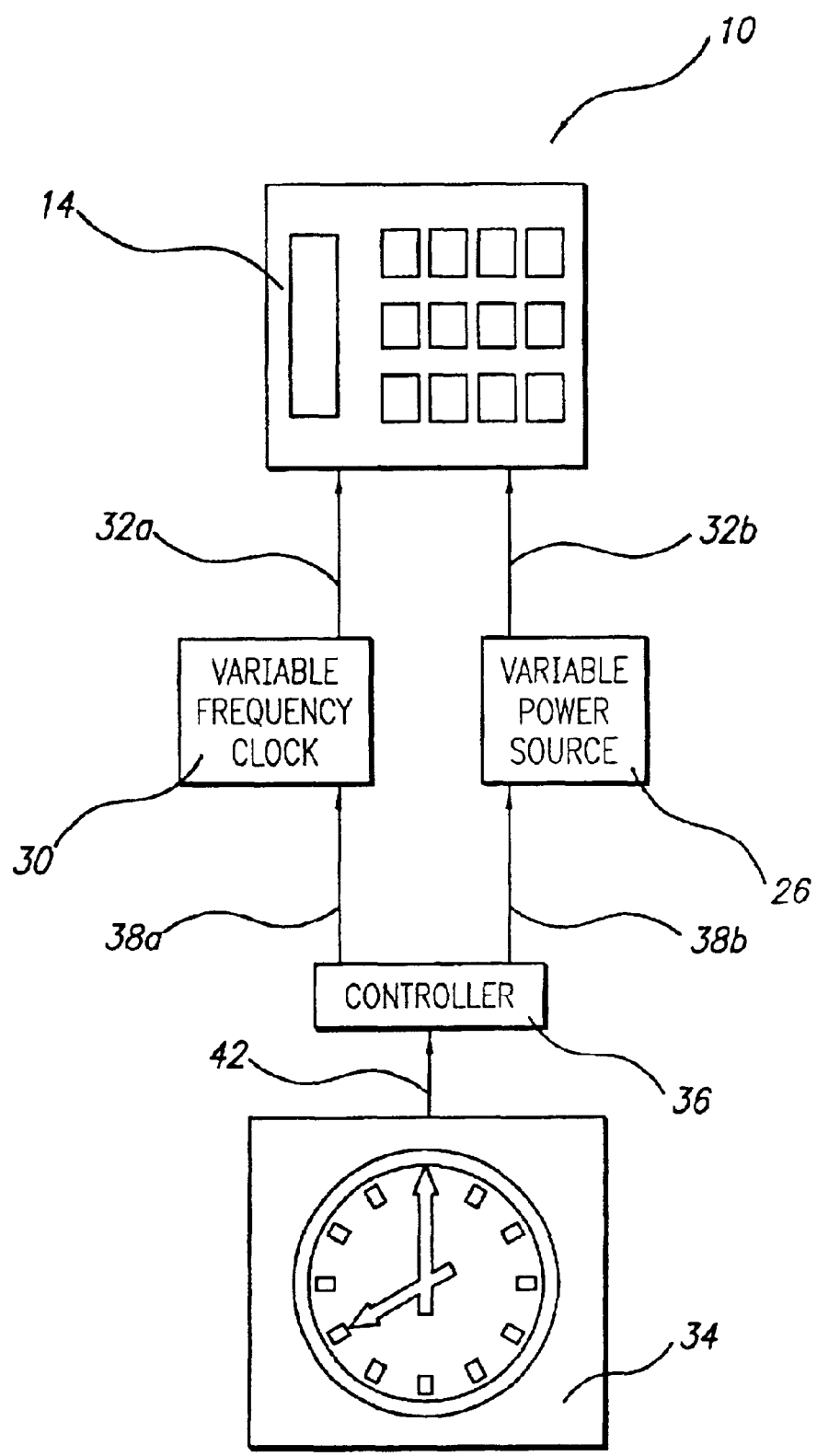
FIG. 3 is block diagram illustrating an embodiment of the present invention in which the voltage supply is controlled as a function of time.

FIG. 3 illustrates the second method by which voltage may be varied in accordance with the present teachings, which is by preprogrammed time points. For example, the voltage 32b is changed at predefined times which are synchronized with position in orbit. FIG. 3 shows a system 10 containing at least one microcircuit 14, a variable power supply 26, a variable frequency clock 30 and a time clock 34. The clock 34 is programmed to send a signal 42 at pre-programmed times to a controller 36. The controller 36 then sends a signal 38b to the variable power supply 26, to adjust the supply voltage 32b. Optionally the controller 36 generates a signal 32a to the variable frequency clock 30 to adjust the clock rate 32a. The voltage 32b and clock rate 32a are calculated to achieve the desired upset rate and performance for the conditions encountered The clock 34 could be the system clock, which is built in to microcircuit systems 10. In this case, programming is added to the system 10 which will generate the signal 42 and required instructions 38a, 38b at the appropriate time.

Figure 4:
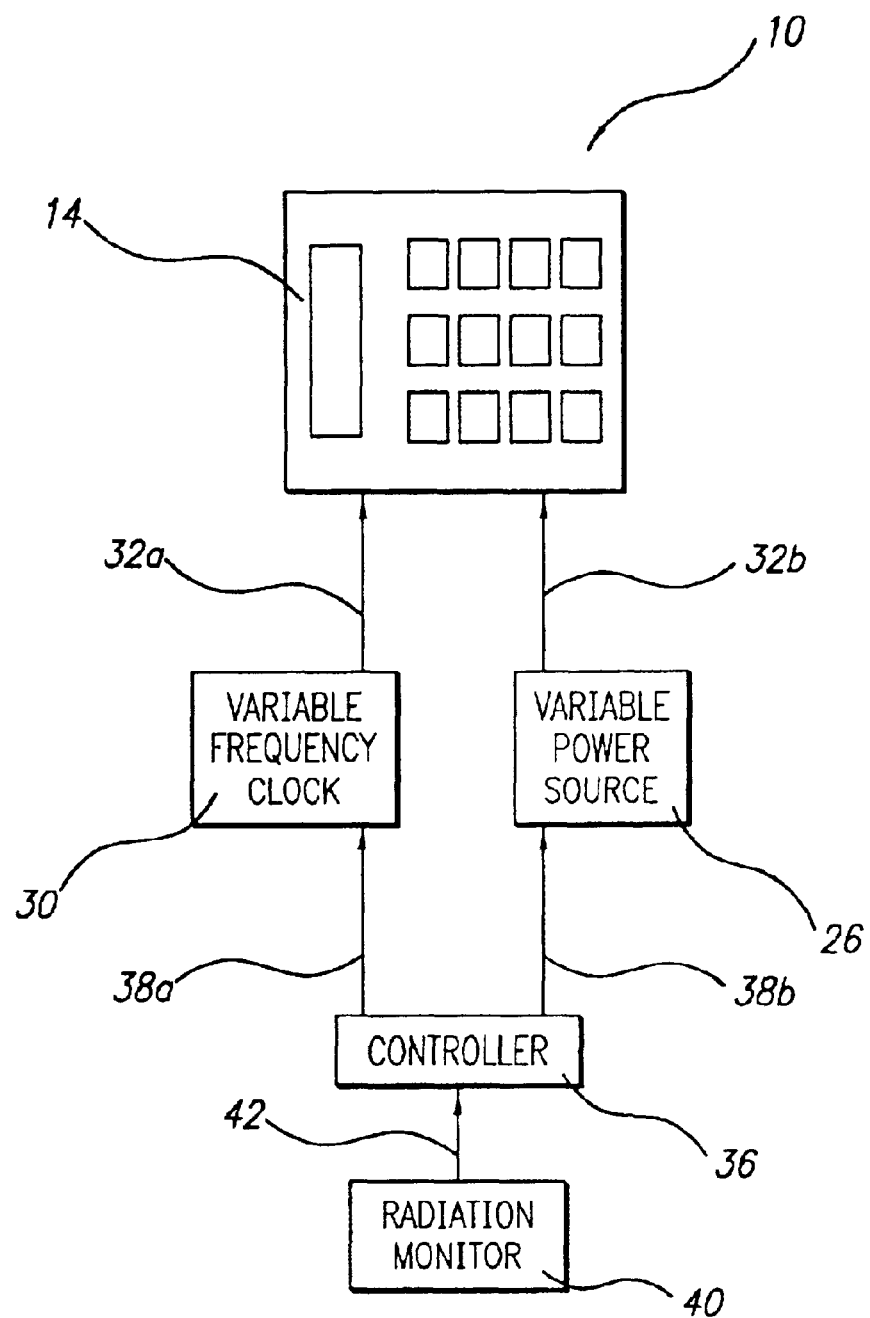
FIG. 4 is block diagram illustrating an embodiment of the present invention in which the voltage supply is controlled locally by monitoring radiation intensity.

FIG. 4 illustrates the third method by which voltage may be varied in accordance with the present teachings, which involves internal measurement of radiation intensity. FIG. 4 shows a system 10 containing at least one microcircuit 14, a variable power supply 26, a variable frequency clock 30, and a radiation monitor 40. The radiation monitor 40 is programmed to send a signal 42 to a controller when the radiation intensity becomes greater or less than predefined levels. The controller 36 then generates a signal 38b to the variable power supply 26, which adjusts the supply voltage 32b. Optionally the controller 36 generates a signal 38a to the variable frequency clock 30 to adjust the clock rate 32a. The voltage 32b and clock rate 32a are calculated to achieve the desired upset rate and performance.

Figure 5:
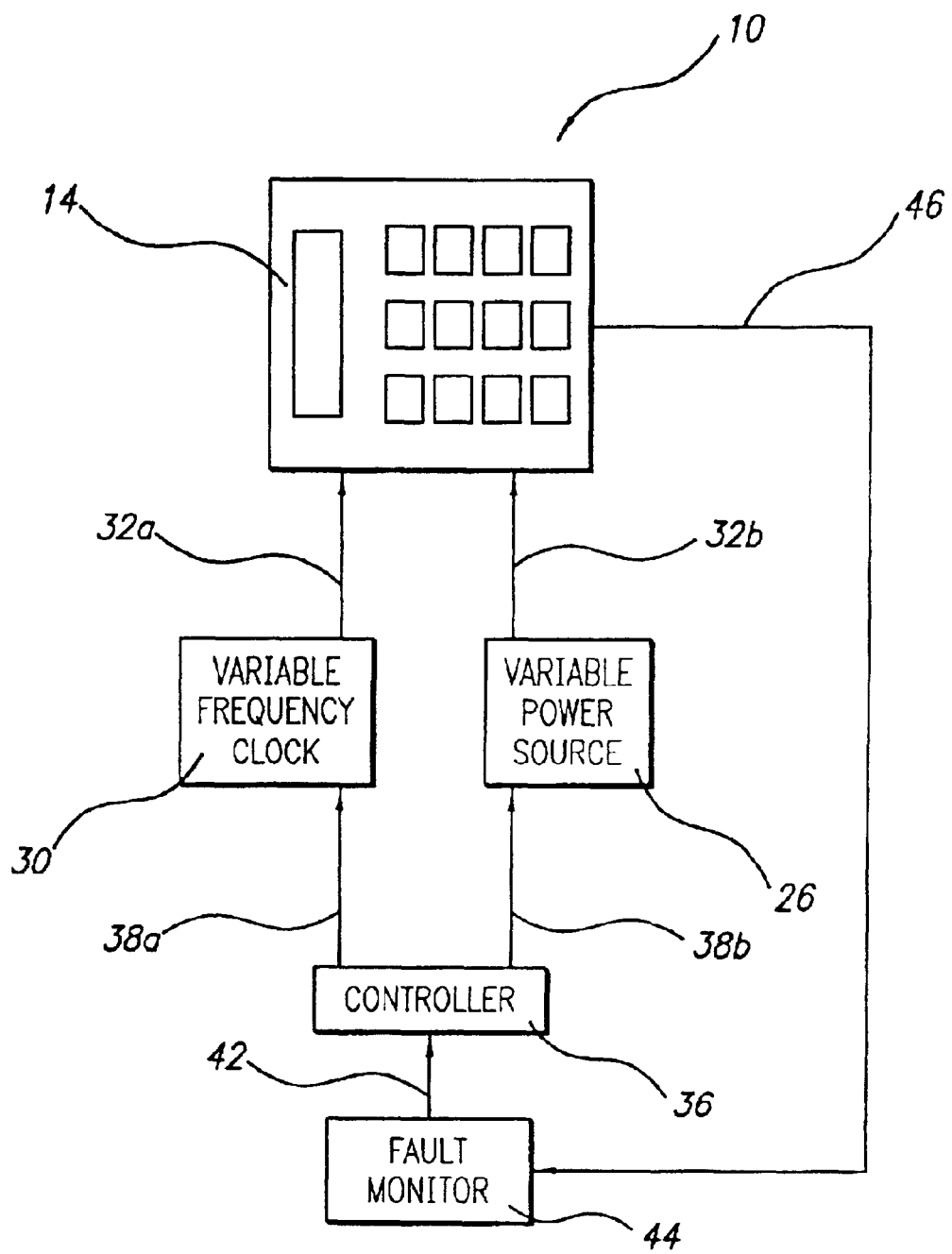
FIG. 5 is block diagram illustrating an embodiment of the present invention in which the voltage supply is controlled as a function of error rate in the system of interest.

FIG. 5 illustrates the fourth method by which voltage may be varied in accordance with the present teachings, which involves self-monitoring of upset rate. FIG. 5 shows a system 10 containing at least one microcircuit 14, a variable power supply 26, a variable frequency clock 30, and a fault monitor 44. The fault monitor 44 receives a measured fault rate 46 from the operating system, and is designed or programmed to send a signal 42 to a controller 36 as the fault rate becomes greater or lesser than certain predefined levels. The controller 36 then generates a signal 38b to the variable power supply 26, which adjusts the voltage 32b. Optionally the controller 36 generates a signal 38a to the clock rate controller 30 to adjust the clock rate 32a. The voltage 32b and clock rate 32a are adjusted to achieve the desired upset rate and performance. Since this method is dependent on error rate of the microcircuit 14, there is a feedback loop 46 from the microcircuit 14 to the fault monitor 44.

The fourth method of control is particularly advantageous, since a processing system 10 can be autonomously adjusted to any variations in the upset environment without prior knowledge. It can also adjust for any cause of upset (not only radiation). For example at a very low voltage 32b, upset may be caused by current leakage. Leakage increases with temperature and decreases with increasing supply voltage 32b. Leakage-induced upset caused by higher temperature can be reduced by increased voltage 32b. Upset rate can thus be kept constant at increased temperature.

In the fourth method, any number of common fault detection techniques could be used. Examples include the rates of occurrence of checksum errors, cyclic redundancy check (CRC) errors, parity errors, voting errors, or memory error corrections. As the rate of upset exceeds a preset threshold value, the supply voltage 32b is increased until the rate again becomes acceptable. As the rate falls below a second threshold value, the voltage 32b is reduced. Note that when error correcting circuitry is used, the rate of occurrence of corrected errors may be used and input to the control system and compensating action is taken before actual errors occur.

Figure 6:
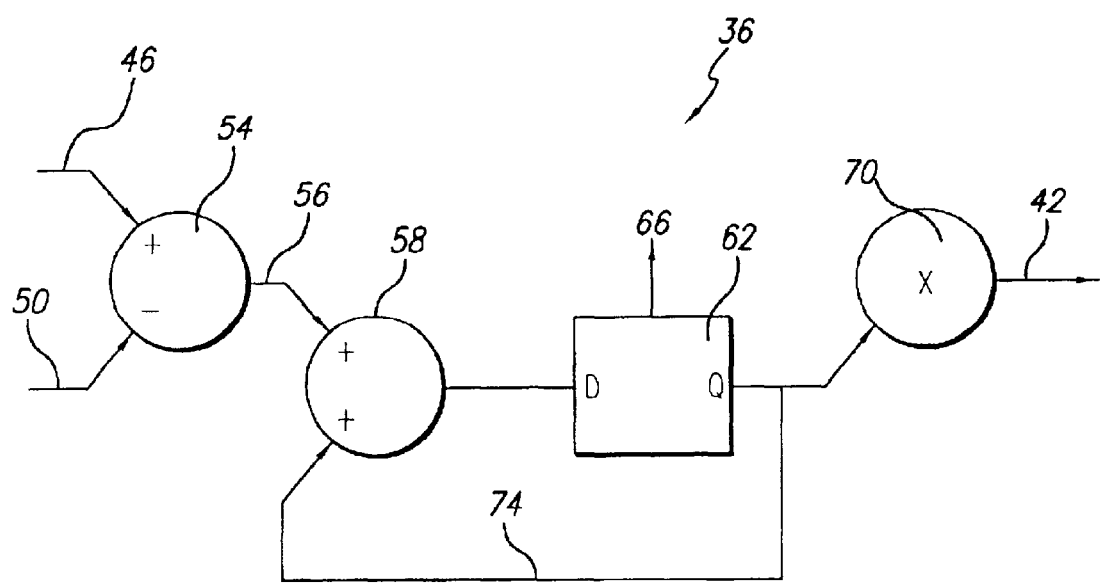
FIG. 6 is a circuit diagram of a controller responsive to measured errors.
Figure 7:
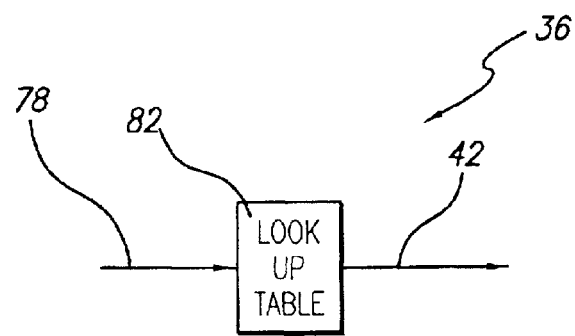
FIG. 7 is a circuit diagram of a controller responsive to measured radiation.

FIGS. 6 and 7 provide examples of controllers 36. FIG. 6 provides a circuit diagram for a controller 36 responsive to the error rate (see FIG. 5). In this controller 36, the measured error rate 46 and a reference or target error rate 50 are fed into a comparator or subtractor 54. The signal 56 from the comparator 54 is sent to an adder 58 where it is incremented or decremented as necessary. The update rate is determined by periodic sampling 66 of the register 62. Finally, the signal 56 is scaled up by the gain control 70 to produce the required actuating signal 42.

FIG. 7 provides a circuit diagram for a controller 36 responsive to measured radiation (see FIG. 4). In this controller 36, the measured radiation rate and energy 78 is fed to look up table 82. The look up table 82 stores predetermined voltage settings as a function of radiation intensity 78. The resulting signal 42 is generated by the values contained in this look up table 82.

Those familiar with this technology will recognize that other controller 36 circuits can readily be devised. Alternatively, a program, i.e. software or firmware, can provide the control function.

The present invention provides a system and method for reducing the upset rate of a digital microcircuit 14 by increasing the supply voltage 32b thereto. The voltage 32b is reduced during more benign environmental conditions in order to minimize power consumption while still maintaining maintain acceptable upset rate and performance. The need to vary the voltage 32b is determined by assessing upset propensity. Upset propensity can be assessed in advance based on knowledge of the environment in which the microcircuit 14 will be operating, or by monitoring the local environment, or by self-monitoring of upset rate within the microcircuit. The latter two methods function as closed loop feedback systems.

Upset susceptibility is strongly inversely dependent on supply voltage 32b, while power/performance ratio is directly dependent on voltage 32b. A system 10 is thus operated at the minimum possible voltage 32b, determined by upset rate. Where susceptibility to upsets increases, e.g. when the radiation intensity is high, voltage 32b is increased such that the upset rate remains acceptable. If the clock rate 32a is maintained constant, power consumption increases. If constant power consumption is desired, the clock rate 32a may be reduced (with proportional performance reduction).

While the present invention has been described with reference to illustrative embodiments for particular applications, those having ordinary skill in the art and access to the teachings provided in this application will recognize additional modifications, applications, and embodiments within its scope and additional fields in which the present invention would be of significant utility.

It is therefore intended by the appended claims to cover any and all such applications, modifications and embodiments within the scope of the present invention.

Accordingly,
What is claimed is:

1. A system for controlling upsets comprising:
    variable power supply means for supplying power to a circuit;
    controller means for providing a first instruction to said variable power supply means to increase the voltage supplied to said circuit when susceptibility to upsets is high and a second instruction to decrease the voltage supplied to said circuit when susceptibility to upsets is low; and
    an ambient radiation monitor for sending an actuating signal to said controller means.

2. The system of claim 1 wherein said controller means is a ground station.

3. The system of claim 1 wherein said ambient radiation monitor includes a pre-programmed clock.

4. The system of claim 3 wherein said pre-programmed clock is the system clock.

5. The system of claim 1 further comprising a variable frequency clock means for regulating the clock rate of said circuit whereby power consumption of said circuit is maintained constant.

6. A system for controlling upsets comprising:
    a variable power supply connected to a circuit;
    a controller connected to said variable power supply; said controller designed to provide a first instruction to said variable power supply to increase the voltage supplied to said circuit when susceptibility to upsets is high and a second instruction to decrease the voltage supplied to said circuit when susceptibility to upsets is low; and
    an ambient radiation monitor designed to send an actuating signal to said controller.

7. The system of claim 6 wherein said controller is a ground station.

8. The system of claim 6 wherein said ambient radiation monitor includes is a pre-programmed clock.

9. The system of claim 8 wherein said pre-programmed clock is the system clock.

10. The system of claim 6 further comprising a variable frequency clock connected to said circuit.

11. A method of controlling upsets comprising the steps of:
    supplying power to a circuit;
    providing a first instruction to a variable power supply to increase the voltage supplied to said circuit when susceptibility to upsets is high and a second instruction to decrease the voltage supplied to said circuit when susceptibility to upsets is low, wherein said supply voltage is varied as a function of local radiation; and
    sending an actuating signal to a controller.

12. The system of claim 11 wherein said supply voltage is also varied as a function of time.

13. The system of claim 11 additionally comprising the step of varying the clock rate of said circuit in order to keep power consumption constant.

14. A method of controlling upsets in a circuit comprising the steps of:
  providing a variable power supply;
  connecting said variable power supply to said circuit;
  providing a controller, said controller designed to provide a first instruction to said variable power supply to increase the voltage supplied to said circuit when susceptibility to upsets is high and a second instruction to decrease the voltage supplied to said circuit when susceptibility to upsets is low,
  connecting said controller to said variable power supply;
  providing an ambient radiation monitor designed to send a signal to said controller to cause said controller to provide said instructions; and
  sending said signal.

15. The system of claim 14 wherein said controller is a ground station.

16. The system of claim 15 wherein said ambient radiation monitor includes a pre-programmed clock.

17. The invention of claim 16 wherein said pre-programmed clock is the system clock.

18. The invention of claim 14 further comprising the steps of:
  providing a variable frequency clock and
  connecting said variable frequency clock to said circuit whereby power consumption of said circuit is maintained constant.

* * * * *